(12) United States Patent
Maynard et al.

(10) Patent No.: US 8,556,082 B2
(45) Date of Patent: Oct. 15, 2013

(54) ROTARY PARTICLE SEPARATOR

(75) Inventors: Donald Maynard, East Lansing, MI (US); Scott T. Merchant, Ithaca, MI (US)

(73) Assignee: Size Reduction Specialists Corp., East Lansing, MI (US)

( * ) Notice: Subject to any disclaimer, the term of this patent is extended or adjusted under 35 U.S.C. 154(b) by 231 days.

(21) Appl. No.: 13/117,335

(22) Filed: May 27, 2011

(65) Prior Publication Data
US 2012/0298563 A1  Nov. 29, 2012

(51) Int. Cl.
*B07B 1/24* (2006.01)

(52) U.S. Cl.
USPC ........... 209/298; 209/285; 209/288; 209/293; 209/294

(58) Field of Classification Search
USPC .......... 209/285, 288, 293, 294, 296, 298, 299
See application file for complete search history.

(56) References Cited

U.S. PATENT DOCUMENTS

| | | | | |
|---|---|---|---|---|
| 264,680 A * | 9/1882 | Fiechter | | 209/403 |
| 304,682 A * | 9/1884 | Gorton | | 209/406 |
| 430,836 A * | 6/1890 | Cook et al. | | 209/298 |
| 452,812 A * | 5/1891 | Trautwein | | 209/298 |
| 468,247 A * | 2/1892 | Jewett | | 209/270 |
| 561,595 A * | 6/1896 | Law | | 209/298 |
| 583,216 A * | 5/1897 | Phillips | | 209/399 |
| 833,617 A * | 10/1906 | Moore | | 209/270 |
| 1,390,334 A * | 9/1921 | Brewer | | 209/293 |
| 3,007,576 A * | 11/1961 | Hannaford | | 209/296 |
| 4,774,097 A * | 9/1988 | Bushman et al. | | 426/489 |
| 4,915,826 A * | 4/1990 | Nordhus | | 209/288 |

* cited by examiner

*Primary Examiner* — Joseph C Rodriguez
(74) *Attorney, Agent, or Firm* — Blue Filament Law PLLC; Avery N. Goldstein

(57) ABSTRACT

A rotary particle separator for separating small particles from large particles is provided and includes an inclined rotary shaft having a first end and a second end. A particle bend is coupled to the elevated first end of the shaft. The particle bend has a bottom surface with a hole therethrough for gravity feed of material including the large particles and small particles from the bend along the shaft towards the second end. Annulae are spaced along the shaft with each of the annulae having a central aperture bounded by a ring that terminates in an annulae outer diameter. At least one paddle is interspersed between two adjacent annulae with at least one paddle positioned to rotate around the shaft. A screen mesh having a mesh size surrounds the annulae with a mesh size such that the small particles within the material are able to pass through the mesh and thereby leave larger particles preferentially segregated within the volume defined by the annulae spaced along the shaft. A large particle exhaust is provided proximal to the second end of the shaft after the particulate has traversed the annulae.

20 Claims, 2 Drawing Sheets

ROTARY PARTICLE SEPARATOR

FIELD OF THE INVENTION

The present invention in general relates to a particle separator and in particular to a rotary shaft separator having multiple annulae spaced along the shaft and having a paddle between two adjacent spaced annulae to allow gravity fed material containing large particles and small particles to successively traverse between annulae as the rotary shaft is turned to selectively allow smaller particulate to pass through a screen mesh surrounding the rotary shaft.

BACKGROUND OF THE INVENTION

Thermoplastic molding produces sprues and other pieces of scrap thermoplastic material in the course of molding articles. Rather than discard this scrap material, it is conventional to the art to grind such scrap into comparatively uniform sized particulate amountable to intermixing with virgin thermoplastic pellets for reprocessing through the molding process. Unfortunately, it is common that debris becomes intermixed with the pelletized thermoplastic scrap. Such debris can compromise the quality of a molded article through creation of an inhomageneity. This problem is especially severe when molding transparent articles in which debris can form a visually discernable inclusion. Further, depending on the processing conditions and the nature of the debris, charring of the debris can occur resulting in a visually discernable black inclusion.

In response to the problems associated with debris becoming entrained with a regrind particle stream or indeed a virgin thermoplastic particle stream, the separators are conventionally used to remove such debris. Conventional separators have included vibratory separators in which material is loaded on to a size exclusion mesh and either manually or mechanically oscillated to shake the debris through the mesh thereby leaving comparatively debris free particulate. However, such vibratory separation schemes require a considerable amount of space and are kinetically slow in separating debris from particulate as a result of electrostatic attraction between the debris and particulate resulting in interparticle transfer of debris as the debris traverses through the particulate before being sieved from the particulate. In response to the limitations of vibratory separation techniques, pressurized air flows have been utilized to flow over a monolayer or several monolayers of particulate to drive the comparatively lighter mass debris from the particles. A number of such systems have also utilized a conveyor or other movement of the material to facilitate such separation. However, pressurized air separation techniques tend to be complex and difficult to maintain on to the inclusion of an air compressor and particle conveyance equipment that increase the footprint of such a separator as well as cost of usage.

Thus, there exists a need for a particle separator that achieves high throughput separation of particulate from debris and does so with limited complexity and moving components. There further exists a need for a particle separator having a small footprint and operative without a pressurized countercurrent gas flow across the material to be separated.

SUMMARY OF THE INVENTION

A rotary particle separator for separating small particles from large particles is provided and includes an inclined rotary shaft having a first end and a second end. A particle bin is coupled to the elevated first end of the shaft. The particle bin has a bottom surface with a hole therethrough for gravity feed of material including the large particles and small particles from the bin along the shaft towards the second end. Annulae are spaced along the shaft with each of the annulae having a central aperture bounded by a ring that terminates in an annulae outer diameter. At least one paddle is interspersed between two adjacent annulae with at least one paddle positioned to rotate around the shaft. A screen mesh having a mesh size surrounds the annulae with a mesh size such that the small particles within the material are able to pass through the mesh and thereby leave larger particles preferentially segregated within the volume defined by the annulae spaced along the shaft. A large particle exhaust is provided proximal to the second end of the shaft after the particulate has traversed the annulae.

A process for separating a material into large particles and small particles is provided that includes adding the material to a feed bin of a separator as detailed above. By rotating the shaft of the separator, small particles are collected external to the mesh and the large particles are collected proximal to the second end of the shaft thereby separating the material into large particle and small particle feeds. The process of particle separation occurring with gravity feed of the material into the separator and rotation of the shaft. The process occurring independent of a pressurized gas stream contacting the material during separation.

BRIEF DESCRIPTION OF THE FIGURES

The present invention is further detailed with respect to the following figures provided to depict exemplary aspects of the present invention in nonlimiting form.

DETAILED DESCRIPTION OF THE PREFERRED EMBODIMENTS

The present invention has utility as a separator of small particulate from large particulate from an intermixed material feed. The present invention finds particular utility in the field of separation of thermoplastic regrind particulate from intermixed debris which constitutes a smaller particulate relative to the thermoplastic regrind. An inventive separator uses a rotary shaft mounting multiple annulae fed by a material feeder bin that meters material into inventor separator. Intermediate between the annulae are at least one paddle that moves the material along a peripheral mesh screen to separate any particulate that passes through the mesh screen leaving the large particulate to traverse between central openings so as to enrich the material passing between annulae in large particulate and small particulate is sieved therefrom the surrounding mesh and into a separate collection stream. Attributes particularly beneficial to the inventive separator include compact footprint and the ability to separate through the use of rotation and gravitational forces. While one can resort to use of a pressurized gas stream to induce material separation between large and small particulate, such pressurized gas stream is not essential thereby simplifying the separation process.

Figure 1:
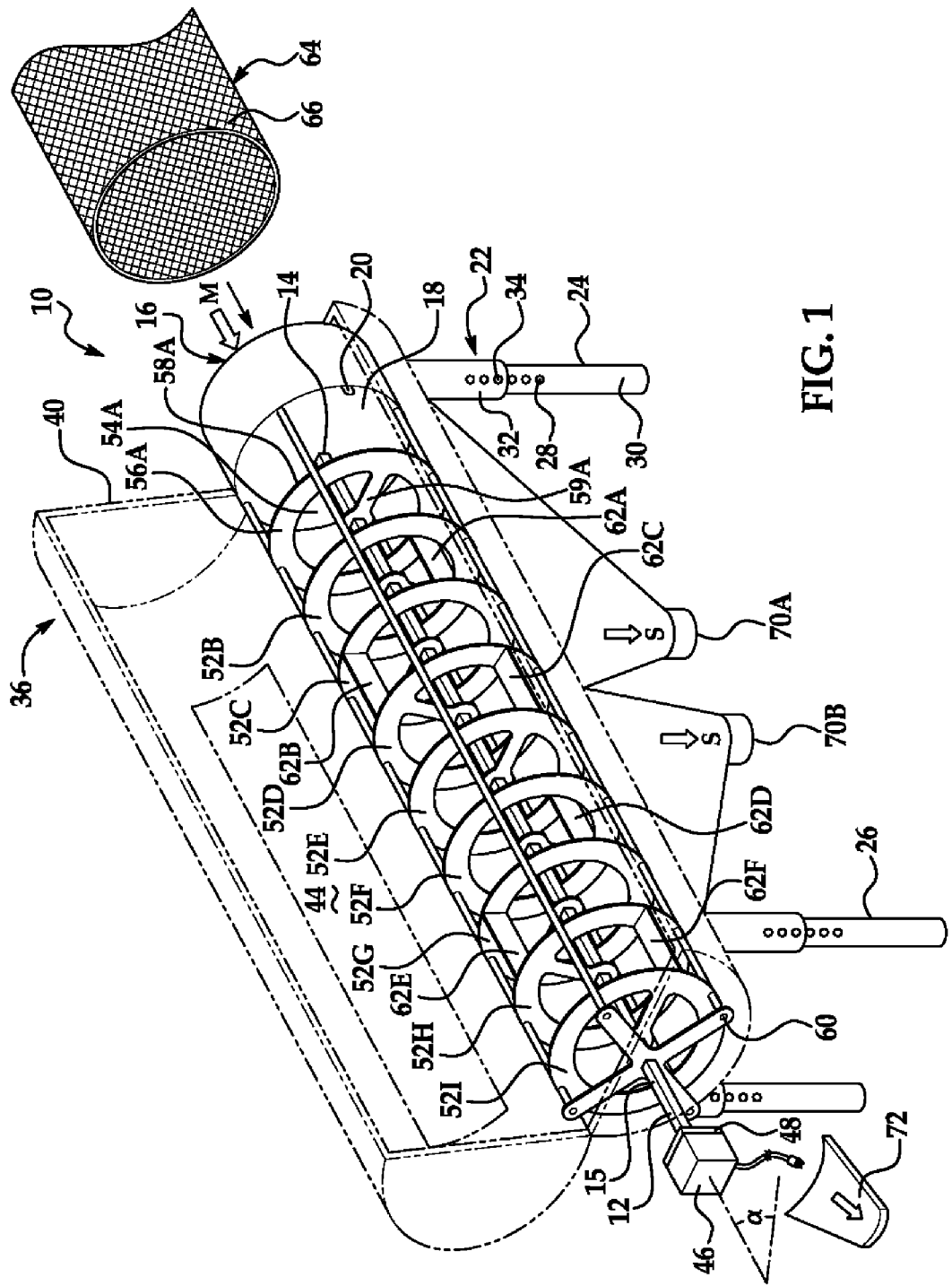
FIG. 1 is a partial cutaway side view of an inventive rotary particle separator.
Figure 2:
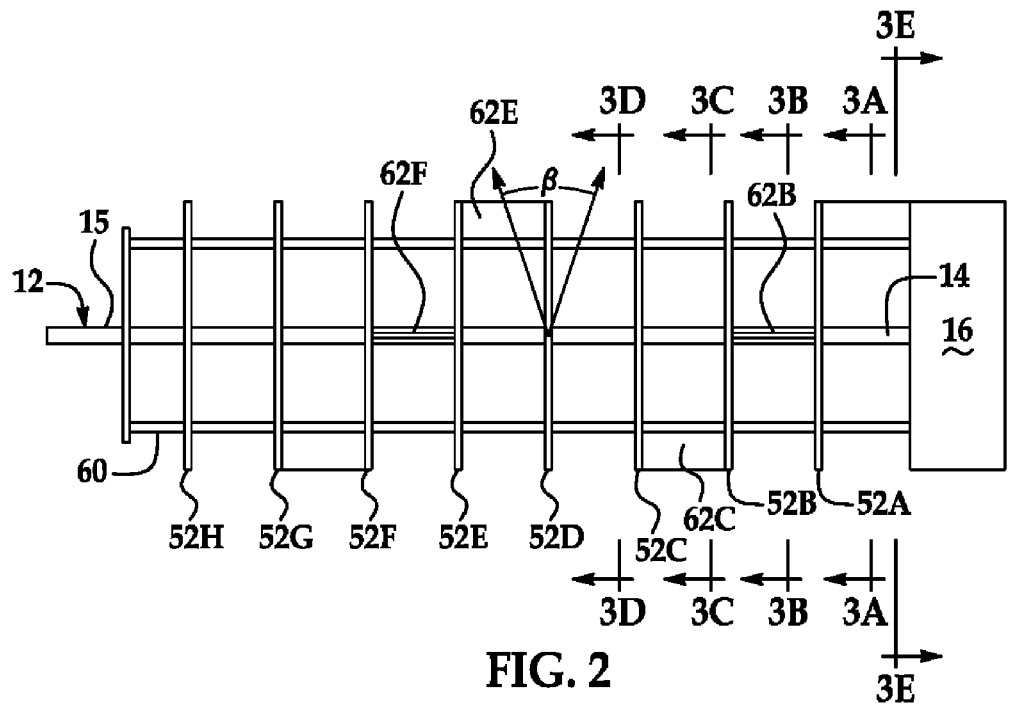
FIG. 2 is a side view of the shaft and associated elements wherein the letters associated with FIG. 2 denote transverse cross-sectional images detailed in FIG. 3.
Figure 3A:
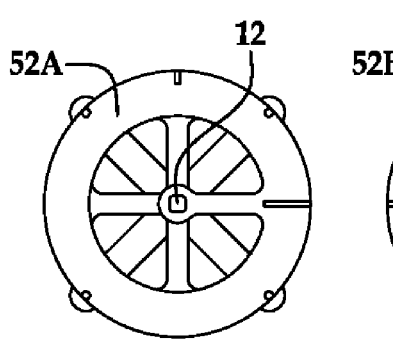
FIGS. 3A-3E are transverse cross-sectional views registry with the letters depicted in FIG. 2.
Figure 3B:
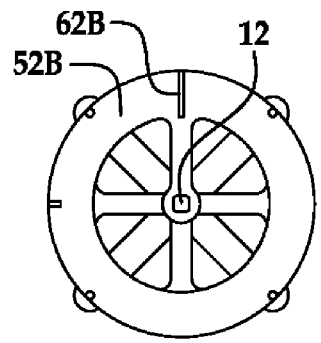
Figure 3C:
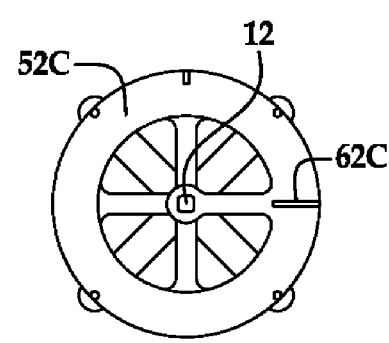
Figure 3D:
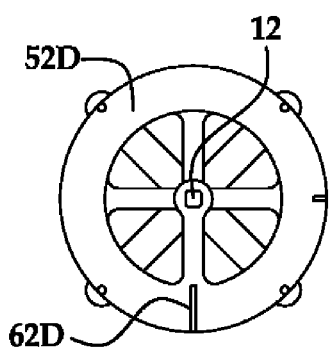
Figure 3E:
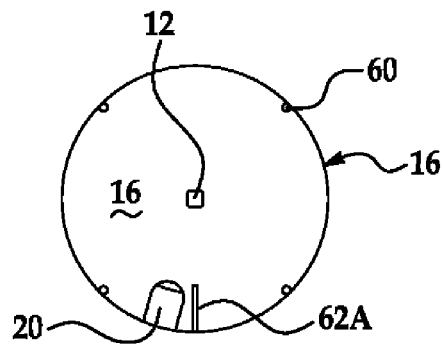

With reference to the attached figures, an inventive particle separator is depicted generally at 10. The separator 10 includes a rotary shaft 12 having a first end 14 and a second end 16. Optionally, the shaft 12 has a polygonal cross-section to engage complimentary engagements associated with the arms 60 so as to limit proportional slippage of a given annulus during rotation. Proximal to the first end 14 a particle feed bin 16 is formed that includes a bottom surface 18 having an aperture hole 20 therein so is to gravity feed a material M along the inclined shaft 12. Typically, the aperture hole has a hole area of between –0.01 and 10% of a bottom surface area of the bottom surface 18. The angle of incline for the shaft 12 relative to horizontal is defined by an angle $\alpha$. Typically, the angle $\alpha$ is between 10-60°, while angles beyond this range are operative so long as material M that enters the feed bin 16 is urged by gravity toward the periphery of feed bin 16 and through the separator 10. An angle $\alpha$ is selectively adjusted using a stand 22 that illustratively includes a higher leg 24 proximal to the first end 14 of the shaft and a shorter leg 26 proximal to the second 16 of the shaft 12. One of ordinary skill in the art will appreciate that through adjustment of the relative height of legs 24 relative to 26 that the angle $\alpha$ is modified. By way of example, the relative height of leg 24 is modified through to aligned holes 28 between a first leg piece 30 and a second telescoping leg piece 32 that when coupled with a locking pin 34 allow for the height of the first end 14 relative to the second end 16 of the shaft 12 to be modified. It is appreciated that numerous modes exist for changing the relative height of the first end 14 relative to the second end 16 besides that shown in FIG. 1. These alternate versions of stand 22 illustratively include the use of a ratchet jack, a screw jack, a hydraulic piston, resort to spacer blocks, or a combination thereof. It is also appreciated that leg 26 also has a variable height as detailed with respect to leg 24 and that such aspects are not depicted in FIG. 1 for the purposes of visual clarity.

Optionally, the separator 10 has a housing 36 to protect the material M from environmental contamination and reduce environmental dusting associated with the separation process. The housing 36 is readily formed of conventional materials including sheet metal, plastics, wood, and combinations thereof. Optionally, the housing 36 has a hinge 38 about which a housing door 40 selectively opens. The door 40 having a latch 42, if the door 40 is present to provide for the selective opening and closing of the door 40. Optionally, part or all of the housing 36 or door 40, if present, is transparent to allow for quick visual inspection as to the operation of the inventive separator 10. For illustrative purposes, a transparent window is depicted at 44. The shaft 12 is driven by a power source 46 such as an electric motor either directly through a mechanical coupling or via an intermediate transmission 48. The power source 46 is readily included within the housing 36 and while depicted proximal to the second end of shaft 12, it is appreciated that the power source 46 is readily mechanically coupled to the first end 14 as well. Optionally, the feed bin 16 is in mechanical communication with a hopper 50 that receives material M including large particles L and small particles S. The hopper 50 is readily formed of the same materials from which housing 36 is formed.

Multiple annulae, 52A-52H are shown collectively at 52 are provided. It is appreciated that as a minimum, to such annulae 52 are provided as denoted at 52A and 52B to perform a separation. Each of the annulae 52 is characterized by a central aperture 54A defined by an outer ring 56A with the outer ring 52 defining an outer diameter 58A. An arm 60A is provided to couple the annulae 52A to the shaft 12. Individual annulae are depicted at reference at 52A-52H. Each annulae as demonstratively shown for annulae 52A is a central aperture 54A with the outer boundaries of which are defined by an outer ring 56A. The outer ring 56A defines an outer diameter 58A. An arm 60A provides a mechanical connection between outer ring 56A and the shaft 12. Preferably, a fastener is provided to selectively adjust the position of annulae 52A along the shaft 12 (not shown). It is appreciated that each of the annulae 52B-52H have corresponding aspects to 52A, 54A, 56A, 58A and 60A yet are not so labeled for visual clarity. An inventive separator 10 has at least two annulae 52A and 52B spaced along shaft 12. It is appreciated that the annulae regardless of the number are regularly spaced or spacing there between varied to achieve desired points of separation. Also, it is appreciated that while the annulae 52 are depicted as having uniform dimension central apertures such as 54A, uniform with outer rings such as 56A, and uniform outer diameter such as 58A, is appreciated that each of these perimeters is independently varied for a given annulus. Also, while each of the annulae 52 as depicted extends orthogonal to shaft 12, it is appreciated that the annulae 52 are readily positioned at an angle $\beta$ of between 75-115° with 0° measured from the first end 14. Typically, each of the annulae is a ring with a ring width as between 20 and 90% of a distance between an outer edge of said shaft 12 and the outer diameter of the annulus. At least one paddle 62 is provided interposed between two adjacent annulae such as paddle 62B disposed between annulae 52B and 52C. About the outer ring 56B. The paddle 62 as exemplified by paddles 62A-62F, operate to urge material M contain large particles and small particles into moving contact with a screen mesh 64 having a screen mesh size 66 that surrounds the annulae 52. While preferably, a paddle 62 is mechanically connected or continuous between adjacent annulae, this need not be the case for an inventive separator to be operative. Additionally, it is appreciated that while the paddles collectively shown at 62 and including 62A-62F are depicted as being radial in orientation relative to the shaft 12 and extending the full width of an outer ring 56 to the outer diameter 58, it is appreciated that an individual paddle is independently mounted between 0-90° relative to the shaft 12 where 0° defines the radial paddle as depicted and 90° depicts a tangential paddle. It is appreciated that the attack angle of a given paddle is readily adjusted to make the paddle operative as a scoop to effectively lift material M away from contact from a surrounding screen 64 whereas a negative paddle attack angle functions to effectively press material M within an inventive separator 10 against the screen 64. To stabilize the rotary portions of an inventive separator 10, a brace 66 is optionally secured to the shaft 12 proximal to the second end 16 with the brace 66 forming anchor points for one or more peripheral stays 68. It is appreciated that the screen 64 is affixed to the shaft 12 and rotates therewith or alternatively, is stationary and the shaft 12 with annulue 52 rotate relative to the screen 64.

The relative position of paddles 62A-62F are preferably displaced from one another to promote a helical progression of material along the length of the shaft 12. An exemplary relative position of paddles 62A-62D is a progression of +90°-+90°-+90° as best depicted in FIGS. 3A-3E. Successive paddles are preferably displaced between ±60° to ±130° and more preferably ±85° to ±95°. Typical patterns of paddle progression are ±30° to ±120°; ±60° to ±120°; ±60° to ±120°. Successive annulae optionally repeat this process in whole or part. It has been found that this pattern of paddles in relative position affords an effective tumbling action to screen small particles S from large particles L that were originally combined in material M.

In operation, material M enters feed bin 16 either directly or through an optional hopper 50. The shaft 12 is then operated at a rotational speed of between 0.1 and 200 rotations per minute to allow the material to be gravitationally tumbled and contact the screen 64 through interaction with paddle 62A and a surface of outer ring 56A as the material M is metered through hole 20. Small particles S are able to pass through the screen mesh 66 thereby leaving the material M enriched in large particles L. Through continued rotation of shaft 12, partially separated material is then transferred to between annulae 52A and 52B to afford a second stage of separation. Optionally, the screen mesh size 66 is graded along the length of the screen mesh 64 with each successive stage of annulae constituting a separate collection stream as depicted at small particle outlets 70A, 70B and 70C. Material M that traverses the length of the shaft 12 along annulae 52 is then collected at large particle outlet 72. It is appreciated that depending on the nature of the material M, the large particulate fraction L, small particulate fraction S, are both represent desired collection streams. In the exemplary case of thermoplastic regrind, typically, the large particle fraction L is desired while the small particle fraction S constitutes undesired debris. It is appreciated that an inventive separator 10 is also well suited for separation of grains and other agricultural products. An inventive separator has the attribute of achieving desired separations with a small footprint amid high degree of adjustment to accommodate different sized distribution materials M, and does so without resort to a pressurized gas stream contacting the material. While such a pressurized gas stream is recognized to be operative with the present invention, usage of a pressurized gas stream such as air is noted to increase complexity of the overall separation process as well as promoting undesirable charging of material M through electrostatics.

Patents and publications mentioned in the specifications are indicative of the levels of those skilled in the art to which the invention pertains. These patents and publications are incorporated herein by reference to the same extent as if each individual application or publication was specifically and individually expressed explicitly in detail herein.

The foregoing description is illustrative of particular embodiments of the invention, but is not meant to be a limitation upon the practice thereof. The following claims, including all equivalents thereof, are intended to define the scope of the invention.

The invention claimed is:

1. A rotary particle separator for separating small particles from large particles from material comprising:
    a rotary inclined shaft having a first end and a second end;
    a particle feed bin coupled to the first end of such shaft and having a bottom surface, the bottom surface defining a hole to gravity feed the material from said bin along said shaft towards the second end;
    a plurality of annulae spaced along said shaft, each of said plurality of annulae having a central aperture encompassed by a ring defining an outer diameter, and having an arm mechanically coupling each of said annulae to said shaft;
    at least one paddle interspersed between two adjacent annulae of said plurality of annulae and rotating about said shaft; and
    a screen mesh having a mesh size, said screen mesh surrounding said plurality of annulae such that the small particulate has a small particle dimension less than the mesh size so as to pass through said mesh and leaving the larger particulate with a large particulate dimension larger than the mesh size within said mesh.

2. The separator of claim 1 further comprising a large particle outlet for collecting large particulate proximal to the second end of said shaft.

3. The separator of claim 1 further comprising a power source mechanically coupled to said shaft directly or through an optional transmission.

4. The separator of claim 1 wherein the aperture hole has a hole area of between −0.01 and 10% of a bottom surface area of the bottom surface.

5. The rotary separator of claim 1 wherein said rotary shaft is inclined at an angle α of between 10 and 60°.

6. The separator of claim 1 wherein said plurality of annulae define an angle β between said shaft and said ring for at least one of said annulae of between 75-115°.

7. The separator of claim 1 wherein at least two of said plurality of annulae have an angle β of between 85-95°.

8. The separator of claim 1 wherein at least one of said plurality of annulae has the ring having a ring width as between 20 and 90% of a distance between an outer edge of said shaft and the outer diameter.

9. The separator of claim 1 wherein the central aperture is generally a circle.

10. The separator of claim 1 wherein at least said of one paddle is simultaneously in mechanical connection between the two adjacent annulae.

11. The separator of claim 1 wherein at least said of one paddle is a plurality of paddles with at least one of said plurality paddles spanning successive annulae of said plurality of annulae to form paddle stages.

12. The separator of claim 11 wherein said at least one paddle spanning successive annulae of said plurality of annulae are radially displaced in successive paddle stages of between 60-130°.

13. The separator of claim 12 wherein successive paddle stages are displaced between 85-95°.

14. The separator of claim 13 wherein three successive paddles stages are rotationally displaced in a pattern of +60-+120°, +60-+120°, +60-+120°.

15. The separator of claim 1 further comprising at least one stay adjoining said plurality of annulae proximal to the outer diameter of each of said plurality of annulae.

16. The separator of claim 15 wherein said at least one stay is parallel to said shaft.

17. The separator of claim 11 wherein said paddle stages are greater than 5.

18. The separator of claim 11 wherein said paddle stages are greater than 7.

19. A process of separating a material into component large particles and small particles comprising:
    adding the material to a feed bin of a rotary particle separator comprising: a rotary inclined shaft having a first end and a second end; the feed bin coupled to the first end of such shaft and having a bottom surface, the bottom surface defining a hole to gravity feed the material from said bin along said shaft towards the second end; a plurality of annulae spaced along said shaft, each of said plurality of annulae having a central aperture encompassed by a ring defining an outer diameter, and having an arm mechanically coupling each of said annulae to said shaft; at least one paddle interspersed between two adjacent annulae of said plurality of annulae and rotating about said shaft; and a screen mesh having a mesh size, said screen mesh surrounding said plurality of annulae such that the small particulate has a small particle dimension less than the mesh size so as to pass through said mesh and leaving the larger particulate with a large particulate dimension larger than the mesh size within said mesh;
    rotating said shaft
    collecting the small particles external to said mesh and the large particles proximal to the second end of said shaft to separate the material wherein the process is independent of a pressurized gas stream contacting the material.

20. The process of claim 19 wherein the material is a majority by weight of thermoplastic regrind.

* * * * *